United States Patent [19]

Kimata et al.

[11] Patent Number: 4,487,495
[45] Date of Patent: Dec. 11, 1984

[54] AUTOMATIC FOCUSING CAMERA

[75] Inventors: Hiroshi Kimata; Masaaki Morizumi, both of Tokyo, Japan

[73] Assignee: Asahi Kogaku Kogyo Kabushiki Kaisha, Tokyo, Japan

[21] Appl. No.: 454,713

[22] Filed: Dec. 30, 1982

[30] Foreign Application Priority Data

Jan. 12, 1982 [JP] Japan ................................. 57-3134

[51] Int. Cl.³ .............................................. G03B 3/10
[52] U.S. Cl. .................................................. 354/403
[58] Field of Search ................. 354/25 R, 25 A, 403

[56] References Cited

U.S. PATENT DOCUMENTS 3,896,457  7/1975  Yamanishi et al. ................... 354/25

Primary Examiner—Russell E. Adams
Attorney, Agent, or Firm—Merchant, Gould, Smith, Edell, Welter & Schmidt

[57] ABSTRACT

In an automatic focusing camera comprising optical object distance detecting means having a light emitting element for measuring an object distance and a light receiving element for receiving the reflected light from an object, provision being made of rotating means which rotates about an optical axis of a camera lens and which has scanning means cooperating with the light receiving element to detect the object distance as a function of an angular displacement of the rotating means.

8 Claims, 9 Drawing Figures

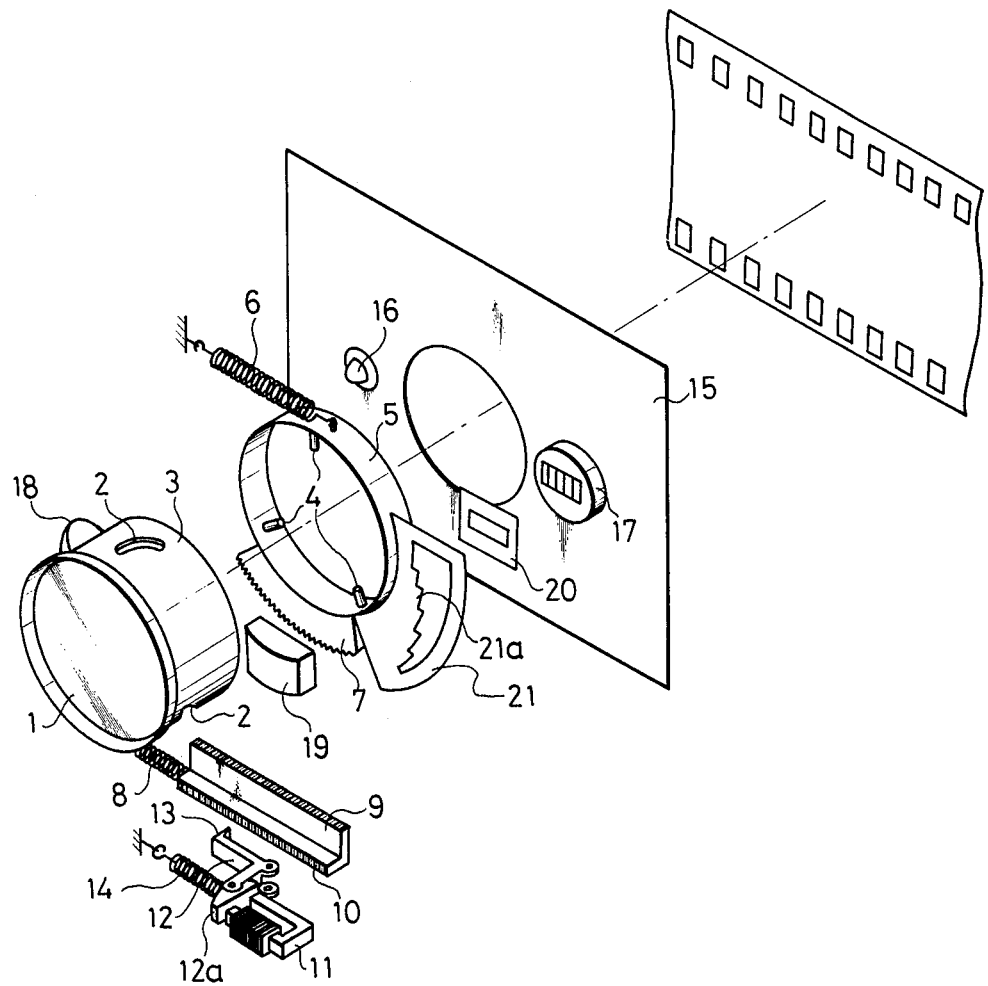

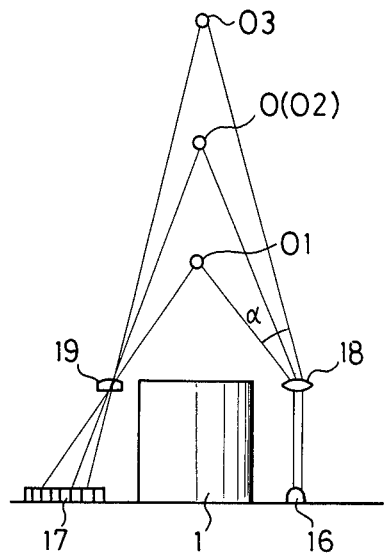
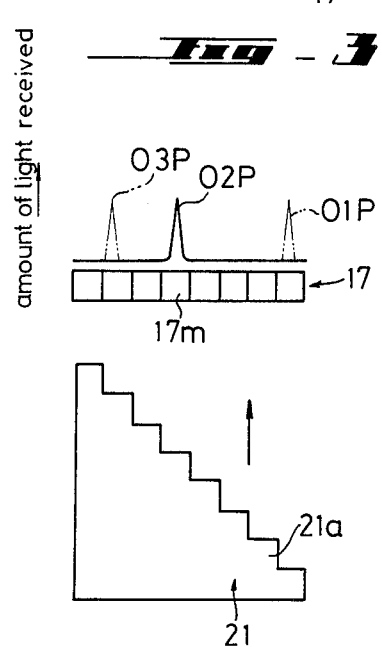
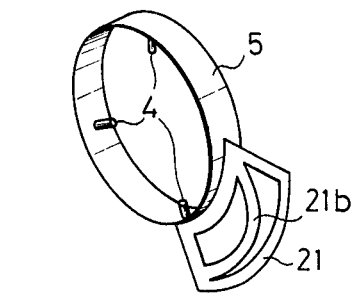

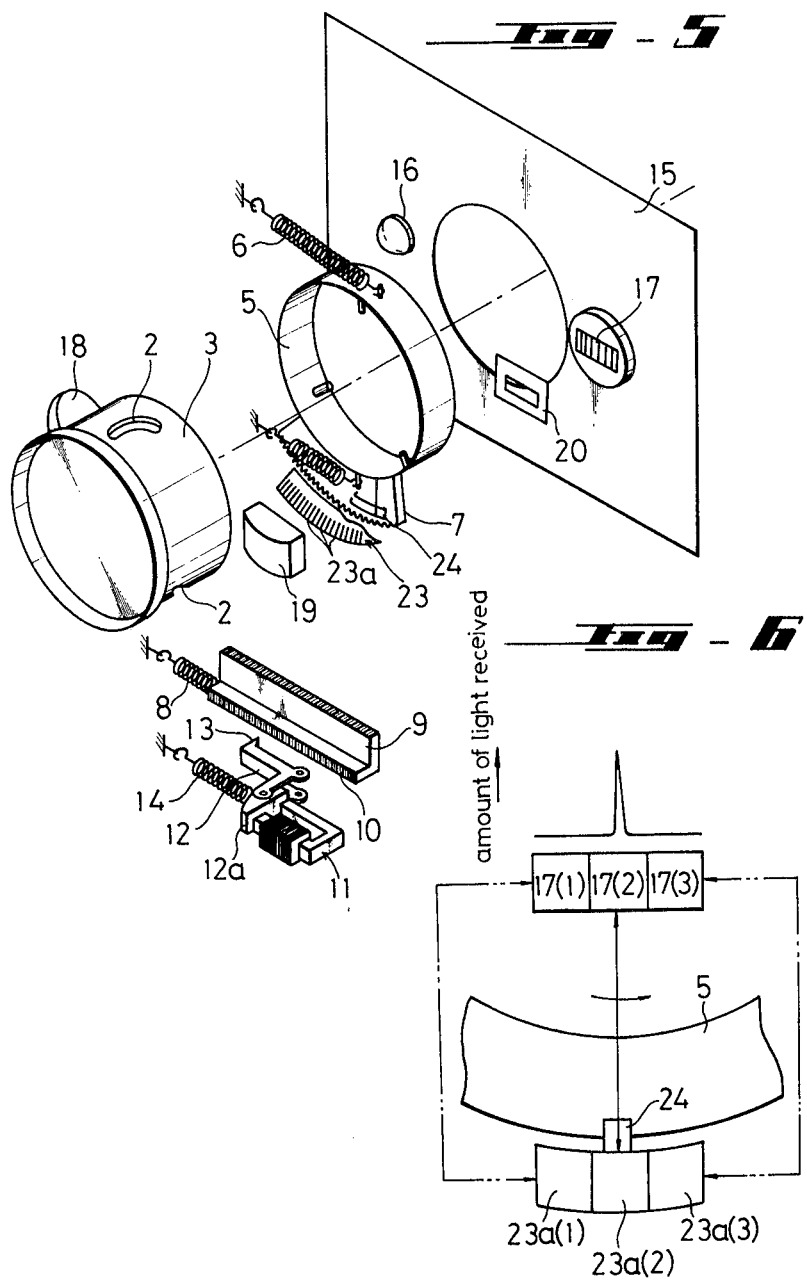

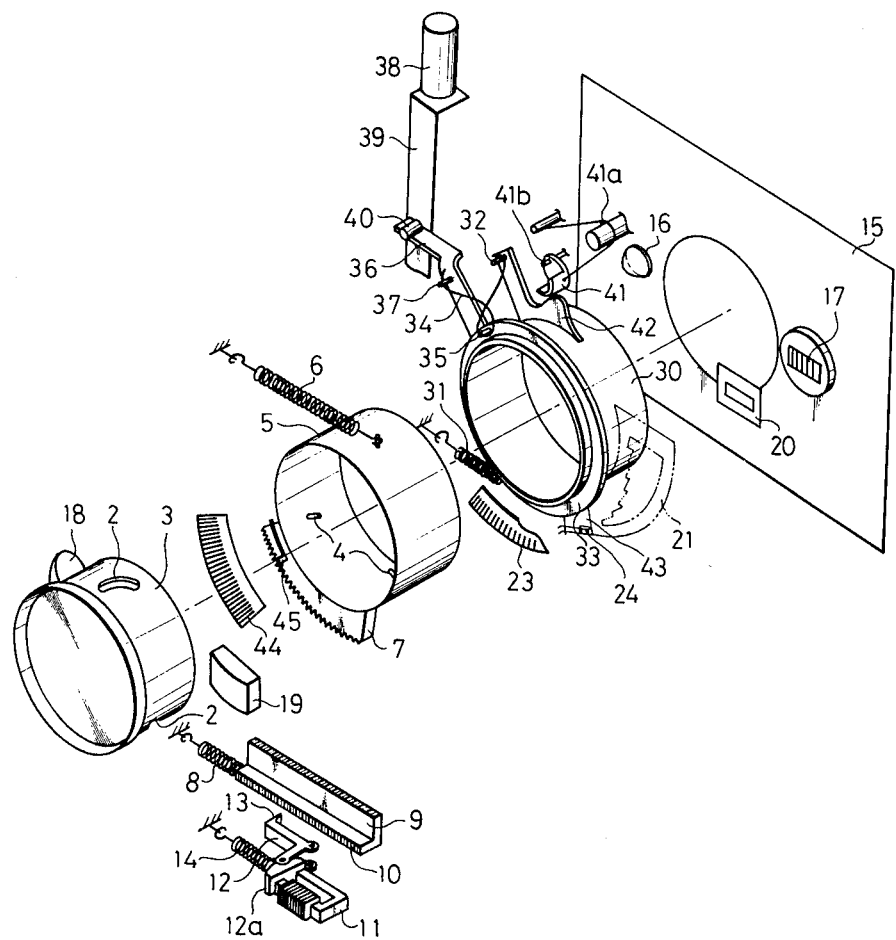

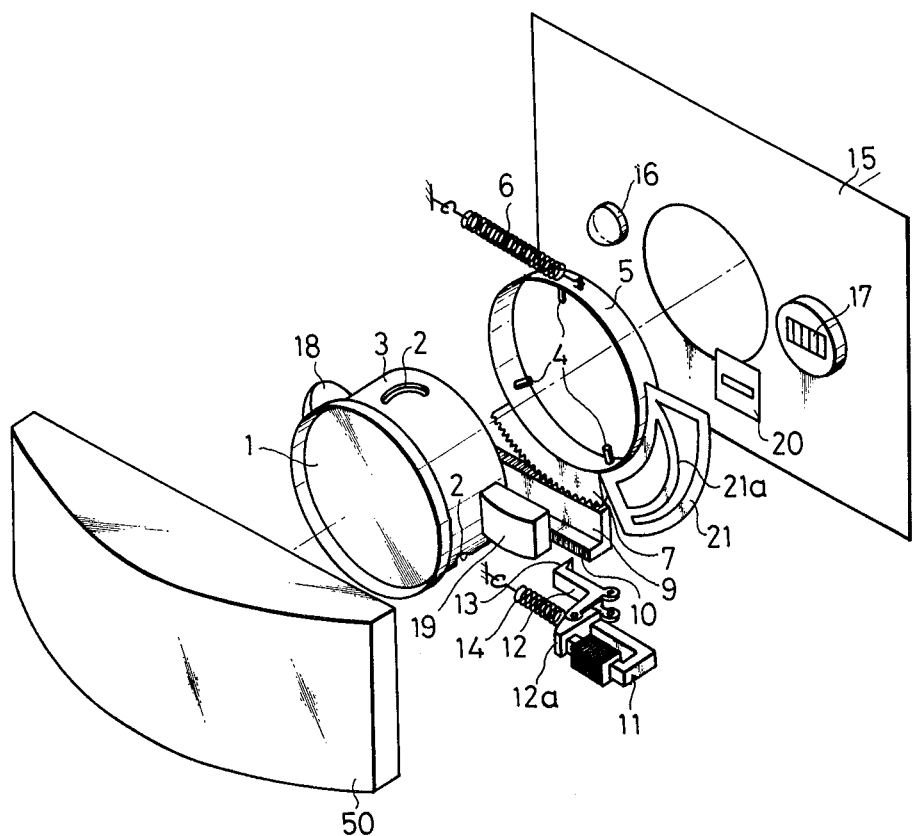

AUTOMATIC FOCUSING CAMERA

This invention relates to an improved automatic focusing camera which emits an object distance measuring or detecting light having a wide illuminating angle covering a range from a short distance to a long distance to detect an object distance by the light reflected from an object, in order to move a camera lens in accordance with the detected distance.

In a conventional automatic focusing camera which is known as so-called a "Leica type", a coincidence of two images is electrically detected to measure the object distance, utilizing the principle of optical range finder, so that the camera lens moves in accordance with the measurement. However, the Leica type of camera is large, since it needs two optical systems for producing two optical images and since a distance (base length) between the two optical systems must be increased to increase an accuracy of the measurement or the detection of the object distance. Furthermore, usually an intermediate member, such as a cam is provided between an object distance measuring or detecting mechanism and an actuating mechanism for moving the camera lens so that the former mechanism is operatively associated with the latter one. However, the provision of such an intermediate member results in complication of the construction of the camera, and in the difficulty of focusing, whereby no satisfying precise focusing can be effected.

There is also known an automatic focusing camera which emits object distance measuring infrared rays having a wide illuminating angle covering a range from a short object distance to a long object distance to detect an object distance by means of the infrared ray reflected from an object, for the purpose of increasing a precision of measurement. However, in this type of known camera, although the precision of measurement can be improved, it has no solution to the above mentioned problems raised by a complex mechanism for operatively connecting the object distance measuring mechanism and the camera lens actuation mechanism, and accordingly automatic focusing cannot be effected with high precision as a whole.

The primary object of the present invention is, therefore, to provide a simple automatic focusing camera which has substantially no or an extremely simple intermediate member for operatively connecting the object distance measuring mechanism and the camera lens driving mechanism and which can ensure a precise detection of an object distance and a precise control of the movement of the camera lens, thus resulting in automatic focusing with high precision.

To achieve the afore-mentioned object of the invention, an automatic focusing camera which emits light rays having a wide illuminating angle covering a range from a short distance to a long distance to detect an object distance by the light rays reflected from an object has, according to the present invention, scanning means which is provided on a rotational member capable of rotating about an optical axis of the camera lens and which cooperates light receiving elements for receiving the light rays reflected from the object to detect the object distance as a function of an angular displacement of the rotational member. The rotational member can be an existing lens driving ring, so that object distance detecting and camera lens driving can be achieved at one time by a single same mechanism i.e., the lens driving ring. Even if an additional rotational member other than the lens driving ring is provided, automatic focusing can be effected only by feeding information of the angular displacement of the rotational member to the lens driving ring.

The invention will be described below in detail with reference to the accompanying drawings, in which:

FIG. 1 is an exploded perspective view of main parts of an automatic focusing camera, according to an embodiment of the present invention;

FIG. 2 is a plan view showing the principle of measurement of an object distance;

FIG. 3 is a diagram showing the principle of measurement of an object distance by the use of an optical scanning mask;

FIG. 4 is a perspective view of a different optical scanning mask;

FIG. 5 is an exploded perspective view of main parts of an automatic focusing camera according to another embodiment of the invention;

FIG. 7 is an exploded perspective view of main parts of an automatic focusing camera in which an object distance measuring operation and a lens driving operation are independently effected, according to another embodiment of the invention;

FIG. 8 is a diagram of a flow chart showing the movement of the camera shown in FIG. 7; and, FIG. 9 is an exploded perspective view of main parts of an automatic focusing camera which has a close-up attachment lens.

Figure 6:
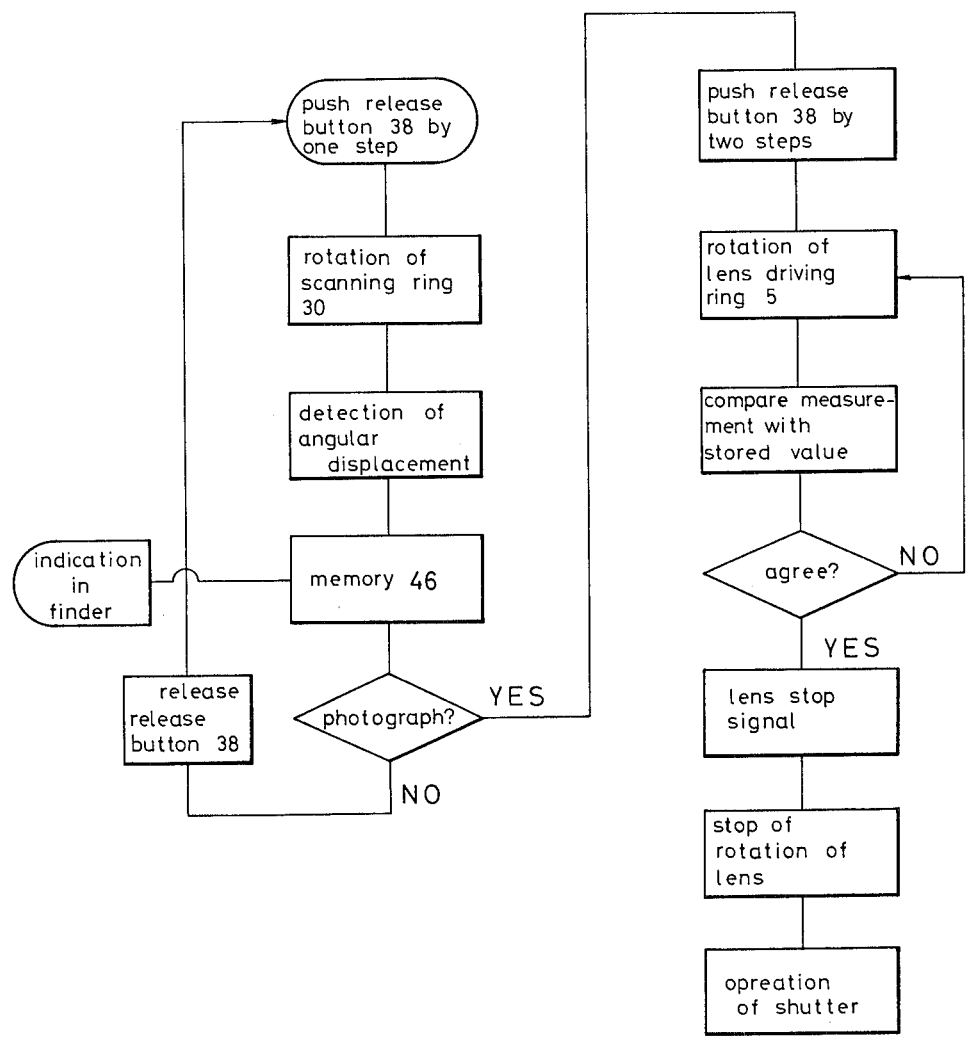
FIG. 6 is a diagram showing the principle of measurement of an object distance by the use of electrical scanning means in FIG. 5.

In FIG. 1 which shows an embodiment of the present invention, a camera lens 1 is secured to a cam ring 3 having cam grooves 2. On the outer periphery of the cam ring 3 is located a lens driving ring 5 which has pins 4 which are engaged in the corresponding cam grooves 2. The lens driving ring 5 rotates against a lens driving spring 6 by means of a drive mechanism (not shown) simultaneously with film advancing and shutter autuating to keep the camera lens 1 at an infinite object distance position (or shortest object distance position). As soon as the driving force applied to the lens driving ring 5 is released immediately before the shutter is released, the lens driving ring 5 is rotated by means of the spring 6 in the opposite direction, so that the camera lens 1 is advanced or retracted by the engagement of the pins 4 in the cam grooves 2.

The ring 5 is provided, on its outer periphery, with a sector gear 7 integral therewith which is engaged by a plate 9 with rack. The plate 9 is continuously biased in one direction by a tension spring 8 and move in its longitudinal directions when the sector gear 7 rotates. The plate 9 has tooth 10 which is engaged by and disengaged from a claw 13 of a stop crank 12 which swings when a lens stop magnet assembly 11 is energized and deenergized. The magnet assembly 11 is composed of a permanent magnet and a magnetic coil. When the magnet is energized, it attracts an armature 12a of the crank 12 by the actuation of the shutter (not shown) to disengage the claw 13 from the tooth 10 of the plate 9. When a shutter release button (not shown) is pushed and the detection of the object distance is completed, the magnet 11 is deenergized in response to a stop signal corresponding to the completion of detection, so that the claw 13 comes into engagement with the tooth 10 of the plate 9 by means of the spring force of a tension spring 14 to stop the movements of the lens driving ring 5 and the camera lens 1.

The above-mentioned construction is a typical one used in a conventional automatic focusing camera, for moving and stopping the camera lens. The discussion will be now directed to an optical object distance measuring system, according to the present invention.

A circuit board 15 located in rear of the lens driving ring 5 has a light emitting element 16 (e.g. Light Emitting Diode) for and light receiving lements 17 (e.g. sensor array) which are located on the opposite sides of the camera lens 1. The measuring infrared rays from the light emitting element 16 illuminate an object $\underline{O}$ at a constant illuminating angle $\alpha$ (FIG. 2) through a floodlight lens 18. The angle $\alpha$ covers a range from a short object distance O1 to a long object distance O3. The light reflected from the object $\underline{O}$ is collected onto the light receiving elements 17 through an imaging or condensor lens 19 and a light receiving element mask 20.

An optical scanning mask 21 is provided on the periphery of the lens driving ring 5 to cooperate with the light receiving element 17, thereby to detect the object distance. The mask 21 has a stepped light intercepting portion 21a which shuts off the light directed to the element 17 little by little in a stepped fashion when the ring 5 rotates.

The object distance can be represented by an angular displacement of the driving ring 5 in the following way.

Supposing that the object $\underline{O}$ is located an intermediate position O2 in FIG. 2, when the shutter release button is pushed, the light emitted from the light emitting element 16 is received in the light receiving elements 17. It should be noted here that a medial light receiving element 17m has a peak value O2P of the amount of the light received in the element 17. At this state, when the lens driving ring 5 rotates, the amount of the light which is intercepted by the light intercepting portion 21a of the scanning mask 21 is steppedly increased. When the lens driving ring 5 comes to a position in which the peak value O2P of the amount of the light received by the medial element 17m is shut off, the output of the medial element 17m is suddenly and largely decreased. By detecting this large change in the output of the medial element 17m, the object distance can be represented by an angular displacement of the lens driving ring 5. That is, the object distance is represented as a function of the angular displacement of the lens driving ring 5.

In the illustrated embodiment as mentioned above, the scanning mask 21 is shaped so that the object distance corresponds to the displacement of the camera lens in the directions of the optical axis of the camera by the lens driving ring 5. As soon as the output of the medial element 17m suddenly and largely varies the magnet 11 is deenergized to stop the camera lens 1 at a desired position corresponding to the detected object distance. The shutter is actuated after the movement of the camera lens is completed.

It can be easily understood that when the object is located at the long distance position O3 or the short distance position O1 the camera lens 1 can be also stopped at a desired position corresponding to the position O3 or O2, in accordance with peak value O3P or O1P (FIG. 3) of the amount of the light received by the elements 17. Automatic focusing can be thus effected over the whole photographing range.

In FIG. 4 showing another embodiment of the scanning mask 21, it has a light intercepting portion 21b which intercepts the light to be received by the light receiving element, so that the amount of the light to be shut off changes continuously rather than steppedly. Also by the scanning mask 21 having the light intercepting portion 21b, automatic focusing can be effected, similarly to the above mentioned embodiment.

The optical scanning mask 21 can be replaced by an electrical scanning means, as shown in FIG. 5. In FIG. 5, the ring 5 has an electrical contact terminal 24 which is provided, for example, on the sector gear 7. The terminal 24 comes into slide contact with a fixed comb-like contact plate 23 with a number of contact terminals 23a. The electrical value such as resistance varies in accordance with a change of contact points of the contact terminal 24 with the contact terminals 23a, so that the angular displacement of the lens driving ring 5 can be detected. Preferably, the number of the contact terminals 23a corresponds to that of the light receiving elements 17, so that the object distance can be represented by the angular displacement of the lens driving ring 5. For the clarification, supposing that there are provided only three light receiving elements 17(1), 17(2) and 17(3) for long distance, medial distance and short distance, respectively, and that there are also provided three contact terminals 23a(1), 23a(2) and 23a(3) corresponding to the three light receiving elements, switching is effected every when the contact terminal 24 comes into contact with the contact terminal 23a(1), 23a(2) or 23a(3), so that electrical scanning of the light receiving elements 17(1), 17(2), 17(3) can be effected simultaneously with the switching operations. When the lens driving ring 5 rotates to a position corresponding to one of the light receiving elements which has a peak value of the amount of the light, the detection of the object distance is completed and the magnet 11 is deenergized. In this way, automatic focusing can be effected similarly to the case of the optical scanning mask mentioned above. The electrical scanning means can effect automatic focusing with higher precision than the optical scanning means, since a large number of light receiving elements 17(1), 17(2), 17(3), . . . . can be provided so that peak values of the light receiving elements can be electrically and precisely detected and calculated to stop the lens driving ring 5 in accordance with the calculating results.

Alternatively, it is also possible to provide the comb-like contact plate 23 on the lens driving ring 5 and to provide the fixed contact terminal 24 on an immovable part of the camera other than the lens driving ring 5.

In the above-mentioned embodiments, the scanning means is provided directly on the lens driving ring 5. Alternativeiy, it is also possible to provide the scanning means on an additional scanning ring 30, as shown in FIG. 7. The object distance is represented by the angular displacement of the scanning ring 30. The detection signal of the object distance is stored and then given to the lens driving ring 5, in the embodiment illustrated in FIGS. 7 and 8. The scanning ring 30 is located in rear of the lens driving ring 5 and is rotatable about an optical axis of the camera lens 1. The scanning ring 30 is continuously biased by a counter spring 31 in a clockwise direction in FIG. 7. The scanning ring 30 has a spring connecting pin 32 to which a spring 34 is connected. On the periphery of the scanning ring 30 is rotatably fitted a scan starting ring 33 which has a pin 35 and a scan starting lever 36. The spring 34 which is connected at its one end to the pin 32 is connected to a pin 37 provided on the lever 36. The spring 34 is also connected to the pin 35. The scan starting lever 36 bears against an abutment pin 40 provided on a release plate 39 which is, in turn, integral with a shutter release button 38, so that when the shutter release button 38 is pushed down, the scanning ring 30 rotates in a counterclockwise direction in FIG. 7. On the scanning ring 30 is provided an escapement projection 42 which is engaged by an escapement rotor 41 rotatable about a pin 41b. The escapement rotor 41 is continuously biased by a spring 41a in one direction.

An electrical scanning means is provided on the scanning ring 30. The scanning means has a tongue 43 which has thereon a slide contact terminal 24. The terminal 24 comes into slide contact with a fixed comb-like contact plate 23 provided outside the ring 30, similarly to the embodiment shown in FIGS. 5 and 6. The slide contact terminal 24 and the contact plate 23 cooperate to effect electrical scanning of the light receiving elements 17 and detection of the angular displacement of the scanning ring 30. In addition to the electrical scanning means as mentioned above, the optical scanning mask 21 can be provided as shown by a phantom line in FIG. 7. In case where the optical scanning mask 21 is provided, the electrical scanning means composed of the contact plate 23 and the contact terminal 24 can be adapted only to detect the angular displacement of the scanning ring 30. The optical scanning mask 21 can be, of course, dispensed with, in the embodiment shown in FIGS. 7 and 8.

The lens driving ring 5 can rotate independently of the scanning ring 30. On the side face of the sector gear 7 of the lens driving ring 5 is provided a slide contact terminal 45 which is in slide contact with a fixed external comb-like contact plate 44. The slide contact terminal 45 and the contact plate 44 have a relationship same as that between the slide contact terminal 24 and the contact plate 23 on the side of the scanning ring 30, so that when the angular displacement of the lens driving ring 5 is identical to that of the scanning ring 30, the electrical output for example, the electrical resistance obtained from the side of the lens driving ring 5 is same as that from the side of the scanning ring 30.

The camera having the construction as shown in FIG. 7 operates as follows.

In FIG. 8 showing a flow chart of the operation, when the shutter release button 38 is pushed down by one step, the scan starting ring 33 is rotated by the scan starting lever 6 in the counterclockwise direction to charge the spring 34. The scanning ring 30 tends to rotate in the counterclockwise direction when the scan starting ring 33 rotates in the same direction, since one end of the spring 34 is connected to the pin 32 of the scanning ring 30. However, the rotation of the scanning ring 30 is prevented by the spring force of the counter spring 31 and the engagement of the escapement rotor 41 with the escapement projection 42 at the initial stage of the rotation of the scan starting ring 33. The further rotation of the ring 33 causes the escapement rotor 41 to ride over the projection 42 against the spring 41a and the counter spring 31, so that the scanning ring 30 is rotated in the counterclockwise direction by means of the spring 34. When the scanning ring 30 rotates, electrical or optical scanning of the light receiving elements is effected by the contact terminal 24 and the contact plate 23 or the optical scanning mask 21, whereby the object distance can be detected by the angular displacement of the scanning ring 30. The afore-mentioned operations are quite same as those of the embodiments shown in FIGS. 1 to 6. In the embodiment illustrated in FIGS. 7 and 8, the angular displacement of the scanning ring 30 is represented by an electrical resistance depending on different contact points of the contact terminal 24 with the contact plate 23. The electrical resistance signal is stored in a memory 46.

After that, when the shutter release button 40 is pushed down by two steps, the engagement of the lens driving lens 5 with the shutter mechanism by means of a mechanism per se known is broken, so that the lens driving ring 5 rotates by means of the spring force of the lens driving spring 6. The angular displacement of the lens driving ring 5 is represented by an electrical resistance depending on different contact points of the contact terminal 45 with the contact plate 44. The resistance is then compared with the first mentioned resistance which is stored in the memory 46 and which corresponds to the angular displacement of the scanning ring 30. As soon as the two kinds of resistances are identical to each other, a stop signal is fed to the magnet 11 to deenergize the latter. When the magnet 11 is deenergized, the claw 13 of the stop crank 12 comes into engagement with the tooth 10 of the racked plate 9 to stop the rotational movement of the lens driving ring 5. After that, the shutter is released.

According to the arrangement shown in FIG. 7, the above mentioned object distance detection and memorization can be effected prior to the drive of the camera lens or can be repeatedly effected independently of a photographing operation, and, accordingly, information of the object distance can be indicated in a finder of the camera. Furthermore, the provision of the lens driving ring 5 and the scanning ring 30 separate from the lens driving ring 5 makes the exchange of the camera lens possible.

Although one angular displacement of the scanning ring 30 directly corresponds to one angular displacement of the lens dring ring 5, in the afore-mentioned embodiments, and although such a correspondence is most practical and advantageous for automatic focusing with high precision, the angular displacement of the scanning ring 30 can be enlarged or reduced in accordance with the amount of the movement of the camera lens so that a reduced or enlarged value of the angular displacement of the scanning ring 30 is fed to the lens driving ring 5. It will be understood that the angular displacements of the scanning ring 30 and the lens driving ring 5 can be reprensented by an electrical value other than resistance, such as condensor capacity or the number of pulses, or the like.

The contact terminal 24 provided on the scanning ring 30 or the lens driving ring 5 and the comb-like contact plate 23 with which the contact terminal 24 comes into slide contact can be also used as switching elements for causing the light emitting element 16 to intermittently emit the light. Such an intermittent emission of light from the light emitting element can be, as is well known, adapted to detect the object distance at a limited zone focusing without decreasing the precision of focusing, so that a service life of a battery provided in a camera can be increased. In the arrangement shown in FIG. 7, the intermittent emission of the light emitting element can be easily effected by alternately making the light emitting element ON and OFF by means of any one of the rotating members which rotate about the optical axis during the detection of the object distance.

Further, in the illustrated embodiments, since the light emitting element 16 and the floodlight lens 18 are provided on one side of the camera lens 1 and the condensor lens 19 and the light receiving elements 17 are provided on the opposite side of the camera lens, when viewed in the optical axis direction, if a close-up attachment lens 50 (FIG. 9) is used, the attachment lens 50 can be of small size enough to cover all of the lenses 1, 18 and 19. That is, the object distance measuring light from the lens 18 and the reflected light from the object into the condensor lens 19 are both refracted by the attachment lens 50 when they pass the attachment lens 50. Since rate of refraction of these light rays is same as that of the light passing the attachment lens 50 for making an optical image on a film face, a small sized attachment lens 50 makes a close-up photographing possible.

The locations of the light emitting optical system and the light receiving optical system are, however, not limited to those illustrated in the drawing figures. Closer the light emitting element to the camera lens 1, smaller the illuminating angle α (FIG. 2). The optical scanning mask 21 must be put on the ring 5 in such a way that the reflected light pass through the mask. However, in case of electrical scanning means, such a positional limitation is unnecessary.

As can be understood from the above discussion, according to the present invention, the object distance can be detected by an angular displacement of a rotary member which rotates about an optical axis of a camera lens. Therefore, by using a presenting lens driving ring as the rotary member, it is not necessary to provide any intermediate member between the object distance measuring mechanism and the lens driving mechanism, resulting in a provision of an automatic focusing camera which has a simple construction and which can be easily handled and controlled with high precision. Furthermore, the provision of a separate scanning ring for detecting the object distance from the lens driving ring makes it possible to effect the object distance detection independently of the photographing operation. Even if the separate scanning ring is provided, since the lens driving ring can be rotated in accordance with the angular displacement of the scanning ring, substantially no or a simple, if necessary, intermediate member is provided between the object distance detecting mechanism and the camera lens driving mechanism, resulting in a simple and high precision automatic focusing camera.

We claim:

1. An automatic focusing camera comprising an active optical object distance detecting means having a light emitting element for transmitting light to an object and a light receiving element spaced apart from said emitting element for receiving the reflected light from an object, and camera lens driving means for moving a camera lens in accordance with the detected object distance, rotating means located outside of and circumferentially about the optical axis of the camera lens which rotates and which has scanning means cooperating with said light receiving element to detect the peak amount of light received from said transmitting element and thereby determine the object distance as a function of an angular displacement of the rotating means.

2. A camera with a shutter release button according to claim 1, wherein said rotating means comprises a lens driving ring which rotates in response to a pushing operation of the shutter release button to move the camera lens, and wherein said scanning means is provided on the lens driving ring, so that the camera lens is displaced to a required position corresponding to the object distance detected by the scanning means.

3. A camera according to claim 2, wherein said scanning means comprises an optical scanning mask which intercepts the light rays received by the light receiving element little by little, in accordance with the rotation of the rotating means, so that the object distance can be detected by a peak value of the amount of the light rays received by the light receiving element, which peak value is detected by the optical scanning mask.

4. A camera according to claim 2, wherein said scanning means comprises an electrical scanning means which detects an angular displacement of the rotating means and a peak value of the amount of the light rays received by the light receiving element, corelating with the angular displacement of the rotating means.

5. A camera according to claim 1, wherein the lens driving ring rotates by an angular displacement equal to that of the scanning ring for detecting the object distance.

6. A camera according to claim 1, further comprising electrical means which feeds electrical outputs varying in accordance with the rotational movements of the scanning ring and the lens driving ring, to the scanning ring and the lens driving ring to detect and control the angular displacements of the rings.

7. A camera according to claim 1, further comprising two-stepped actuation type of shutter release button which causes the scanning ring to rotate when the button is pushed by one step and which causes the lens driving means to move when the button is pushed by two-steps.

8. An automatic focusing camera comprising an active optical object distance detecting means having means for emitting object distance measuring light rays and means for receiving the light rays reflected from an object, and a camera lens driving means for moving a camera lens in accordance with the detected object distance, said emitting and receiving means being located outside of the optical field of said lens, a scanning ring which rotates and is located outside of and circumferentially about the optical axis of the camera lens, scanning detection means on the scanning ring for cooperating with said light receiving means to detect the peak amount of light received from said transmitting means and thereby determine the object distance as a function of an angular displacement of the scanning ring, means for memorizing the detected object distance, a lens driving ring which rotates about the optical axis of the camera lens to move the camera lens, and means for rotating the lens driving ring through an angular displacement corresponding to the memorized object distance.

* * * * *